United States Patent
Busjaeger et al.

(10) Patent No.: US 11,157,466 B2
(45) Date of Patent: Oct. 26, 2021

(54) DATA TEMPLATES ASSOCIATED WITH NON-RELATIONAL DATABASE SYSTEMS

(71) Applicant: salesforce.com, inc., San Francisco, CA (US)

(72) Inventors: Benjamin Busjaeger, San Carlos, CA (US); Michael Sgroi, San Francisco, CA (US); Scott D. Hansma, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 330 days.

(21) Appl. No.: 16/121,598

(22) Filed: Sep. 4, 2018

(65) Prior Publication Data

US 2020/0073972 A1   Mar. 5, 2020

(51) Int. Cl.
    *G06F 16/21* (2019.01)
    *G06F 16/25* (2019.01)
    *G06F 16/242* (2019.01)
    *H04L 29/08* (2006.01)

(52) U.S. Cl.
    CPC ........ *G06F 16/211* (2019.01); *G06F 16/2448* (2019.01); *G06F 16/25* (2019.01); *G06F 16/258* (2019.01); *H04L 67/02* (2013.01)

(58) Field of Classification Search
    None
    See application file for complete search history.

(56) References Cited

U.S. PATENT DOCUMENTS

| | | | |
|---|---|---|---|
| 6,212,524 B1 * | 4/2001 | Weissman | G06F 16/283 |
| | | | 707/600 |
| 9,378,263 B2 | 6/2016 | Khimich et al. | |
| 10,169,380 B1 * | 1/2019 | Earl | G06F 16/258 |
| 2012/0005241 A1 * | 1/2012 | Ortel | G06F 16/212 |
| | | | 707/803 |
| 2014/0304245 A1 | 10/2014 | Fuchs | |
| 2015/0142783 A1 | 5/2015 | Bruce et al. | |
| 2015/0205885 A1 | 7/2015 | Zhou et al. | |
| 2017/0177615 A1 | 6/2017 | Lee et al. | |
| 2019/0377713 A1 * | 12/2019 | Lankford | G06F 16/213 |

* cited by examiner

*Primary Examiner* — Robert W Beausoliel, Jr.
*Assistant Examiner* — Cheryl M Shechtman
(74) *Attorney, Agent, or Firm* — Kowert, Hood, Munyon, Rankin & Goetzel. P.C.

(57) ABSTRACT

In various embodiments, a computer system implements a service that stores a plurality of database templates that define data types supported for a non-relational database accessible to a plurality of applications. The service receives, from a developer of an application, a selection of one of the plurality of database templates to be used by the application. In response to the selection, the service issues a set of data definition language (DDL) instructions to provision the non-relational database with a schema that implements a particular data type defined by the selected template. Requests from the application to manipulate a value of the particular data type stored in the non-relational database system are serviced. In some embodiments, the servicing includes identifying a set of data manipulation language (DML) instructions to be executed and issuing the set of DML, instructions to the non-relational database.

18 Claims, 8 Drawing Sheets

Part.json _210A_

```
{
  "name" : "Part",               ⟵ 302A
  "abstract" : true,
  "fields" : [                   ⟵ 304
     "name" : "aggregate_id",
     "type" : "string"
  }
  "relationship" : [             ⟵ 306
     "name" : "AggregateRelationship",
     "fields" : : [ "aggregate_id" ],
     "referencedType" : "Aggregate",
     "referencedFields" : "id"
  ]
}
```

152

Aggregate.json _210B_

```
{
  "name" : "Aggregate",          ⟵ 302B
  "abstract" : true
}
```

FIG. 3

```
Part.java                                          220A
            402A
class PartProcessor {
            404A
  void create(Part part) {
    table.putIfNotExists(part);  ~406
  } void update(Part part) {
    table.putIfExists(part);
  } void delete(Part part) {
    table.deleteIfExists(part);
  } void processRecords(List<Record> changes) {
    aggregateRelationship.processRecords(changes);
  }
}
```

```
Aggregate.java                                     220B
            402B
classAggregatetProcessor {
            404B
  void processRecords(List<Record> changes) {
    Map<String, List<Record>> byAggregate = // group by aggregate
    byAggregate.for each(this::processRecordsForAggregate);
  } void processRecordsForAggregate(String aggregateId, List<Record> changes) {
    Aggregate aggregate = get(aggregateId)
    // filter out changes already aggregated before
    for (Record record : records) {
      for (SummaryField summaryField : getSummaryFields()) {
        summaryField.compute(aggregate, record)
      }
    }
  }
}
```

*Opportunity.json*

```
{
   "name" : "Opportunity",         ── 502A
   "baseType" : "Part",            ── 504A
   "fields" : [                    ── 506A
     {
        "name" : "value",
        "type" : "number"
     },
     ...
   ],
   "relationship" : [              ── 508
      "name" : "AccountRelationship",
      "referencedType" : "Account",
   ]
}
```

500B

*Account.json*

```
{
   "name" : "Account",             ── 502B
   "baseType" : "Aggregate",       ── 504B
   "fields" : [                    ── 506B
     {
        "name" : "total",
        "type" : "summary",
        "formula" : "SUM Opportunity.value"
     },
     ...
   ]
}
```

DATA TEMPLATES ASSOCIATED WITH NON-RELATIONAL DATABASE SYSTEMS

BACKGROUND

Technical Field

This disclosure relates generally to storage systems, and, more specifically, to non-relational databases.

Description of the Related Art

Many database systems have traditionally relied on a relational model in which data may be organized into one or more tables based on the interrelationship of the data. For example, a company might have a database table of employee information that includes columns for first and last names, company positions, email addresses, phone numbers, etc. A given row within the table may then correspond to a respective employee's information. This model for organizing data can be easy to understand from a developer standpoint as it follows as a traditional way of organizing information. Simple query languages, such as structured query language (SQL), are also widely prevalent for easily writing queries to relational databases.

More recently, however, some databases have attempted to move away from this model and use different organization schemes for storing data. These databases may be referred to as non-relational databases (or NoSQL databases).

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "application server configured to host an application" is intended to cover, for example, a computer system having, for example, a processor, network interface, memory having program instructions, etc. to performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to initial two created user accounts, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

Schema design for relational databases has traditionally relied on a data-modeling approach in which developers create a database schema for an application based on the interrelationship of the data being maintained in the database. To reduce data redundancy and improve data integrity, this database schema may further be structured in accordance with one or more criteria (referred to as "normal forms") through a database normalization process. A schema designed in this manner, however, may make various sacrifices at the costs of scalability and performance in order to be compliant with these normal forms. If a database handles large volumes of transactions, this inevitably results in the schema being modified to improve particular operations and breaking from these normal forms. Non-relational databases have gained in popularity recently due to their potential to deliver greater performance over relational database systems. In contrast to relational databases, design for non-relational databases has focused on a denormalized approach in which the schema is redesigned to improve performance through redundancy and data reorganization. While this schema is better suited for handling large volumes of transactions, designing this type of schema is more difficult to implement well and maintain.

The present disclosure describes embodiments in which a development platform assists developers in designing applications capable of leveraging the benefits afforded from non-relational databases. As will be described below in various embodiments, the development platform can present various database templates for frequently used data types having different access patterns. Instead of defining a schema supporting a particular data type and writing the appropriate instructions to implement it with respect to a non-relational database, an application developer can select a predefined database template provided by the platform. The platform can then provision a non-relational database with a schema that implements the particular data type defined by the selected database template. In various embodiments, a template service situated between the developer's application and the non-relational database processes requests from the application to manipulate values associated with the data type and issues the appropriate instructions to the non-relational database to fulfill those requests. For example, a developer designing an application that presents a total number of parts in a warehouse may select a database template for an aggregate data type to cause instantiation of the data type in a schema of the non-relational database. The application may then send requests to the template service to update information in the database when parts are added or removed so that these changes can be reflected in the non-relational database. As the service is responsible for providing the appropriate instructions to the non-relational database, an application developer does not need to incorporate non-relational database instructions in the application to, for example, record part changes in the database, determine the total number of parts, etc.

Still further, the template service may handle more complex operations transparently to the developer and that go beyond merely implementing insertions, updates, and deletions. For example, in some embodiments, a given template may implement local caching, index generation, etc. without requiring involvement of the application using the template. A given template may also select where and how information is stored within the non-relational database—e.g., whether two data types of a given template are stored within the same or separate tables. A given template may also determine whether requested operations are performed synchronously (e.g., upon request) or asynchronously (e.g., at a later time, but in an optimized manner).

In various embodiments, a given template can define a base type that can support multiple concrete data types used by an application. For example, an aggregate data type discussed below may be used to determine an accumulation of a particular part (a first concrete data type) in a warehouse and separately used to accumulate a total of potential sales leads (a second concrete data type). In doing so, a given data template may support a broad spectrum of uses.

Providing templates to support non-relational-database integration can greatly simplify the programming model for a developer as a developer, for example, does not need to be proficient in schema design for the non-relational database and the database's query language. Still further, schemas provided by the platform to support various data types may be specially tailored to maximize storage efficiency and lessen access times. As a result, developers using the platform may be encouraged to integrate use of non-relational databases.

Figure 1:
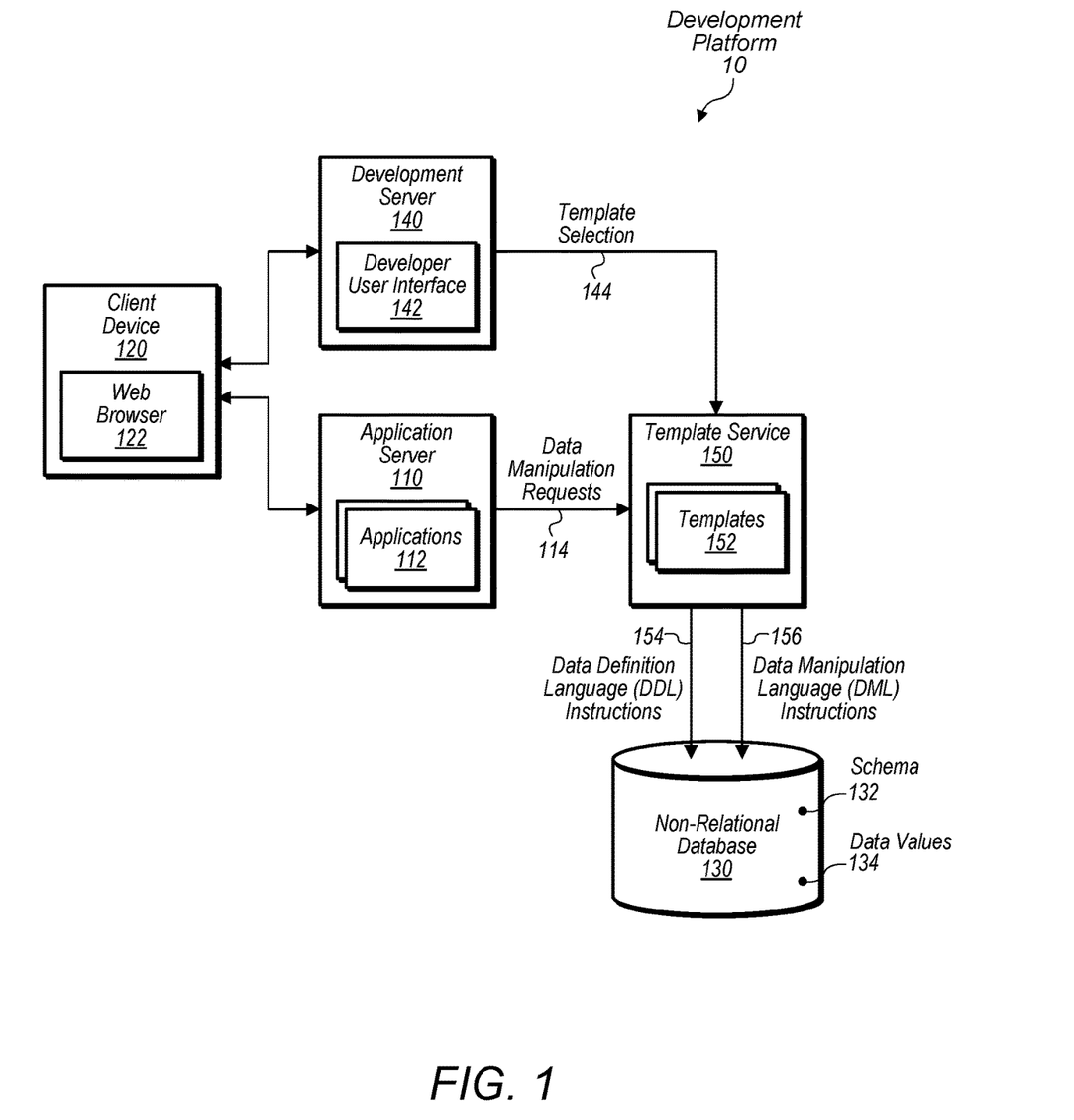
FIG. 1 is a block diagram illustrating one embodiment of a development platform that provides templates for a non-relational database system.

Turning now to FIG. 1, a block diagram of a development platform 10 is depicted. In the illustrated embodiment, platform 10 includes an application server 110, client devices 120, non-relational database 130, development server 140, and template service 150. In some embodiments, platform 10 may be implemented differently than shown—e.g., platform 10 may include multiple instances of elements 110-150, client devices 120 may not be part of platform 10, one or more elements may be combined, etc.

Development platform 10, in various embodiments, facilitates the creation and deployment of applications 112. In the illustrated embodiment, applications 112 are hosted on an application server 110 configured to serve applications 112 to various client devices 120. In some embodiments, server 110 implements a web server that serves web content of applications 112 to web browsers 122 executable to render content on devices 120. Applications 112 may correspond to any suitable application. For example, in some embodiments, applications 112 may include applications executable to facilitate customer relationship management (CRM), applications to facilitate business-to-business (B2B) or business-to-commerce (B2C), etc. As will be described in greater detail below, in various embodiments, applications 112 may maintain various information in non-relational database 130.

Non-relational database 130, in various embodiments, is configured to store data values 134 for applications 112 in accordance with a non-relational storage schema 132. In some embodiments, database 130 is a key-value storage in which each stored value 134 is associated with a respective key usable to retrieve or update that value—the key and value being collectively referred to as a key-value pair. In other embodiments, database 130 may implement other non-relational schemas 132 for storing values 134 such as a triple store, graph database, etc. In some embodiments, database 130 may be hosted on a computer cluster implementing a cloud storage service. Although various embodiments are discussed below with respect to non-relational databases, applications 112 may also access relational databases or other forms of databases in some embodiments.

Development server 140, in various embodiments, is configured to assist developers in creating and deploying applications 112. Accordingly, server 140 may present a developer user interface (UI) 142 for an integrated development environment (IDE), which may be accessible to developers via a web browser 122. Developer UI 142 may incorporate a source code editor, build automation, debugger, etc. Server 140 may also provide various code libraries, which developers can incorporate into their applications 112. As noted above, in various embodiments, developer UI 142 presents one or more menus depicting multiple database templates 152, which can be selected by a developer to facilitate an applications 112's use of non-relational database 130.

Templates 152, in various embodiments, define a set of one or more data types along with a set of operations that can be requested and performed with respect to the data types. For example, a basic database template 152 may define a single data type and permit performance of CRUD operations (i.e., create, read, update, and delete operations) with respect to the data type. Other database templates 152, however, may more support more complex data types. Accordingly, as noted above, templates 152 may include a template 152 supporting an aggregate data type that can count a number of recorded events (e.g., items being added to an inventory) and can present a corresponding aggregate value (e.g., an inventory total). Other examples of templates 152 may include a template 152 defining a voting data type in which users can select between different choices and have a vote tally determined, a template 152 defining a token data type that can be allocated to a predefined number of items and later redeemed for some purpose, etc.

In various embodiments, when a developer selects a given template 152 in developer UI 142, UI 142 may also present a wizard that allows a developer to further define attributes of the data type such as supplying a name (e.g., "inventory" for an aggregate data type), initial values for one or more fields (e.g., "an initial inventory value"), etc. Is some embodiments, UI 142 may also permit a developer to extend a template-defined data type by defining additional properties—or redefining properties to better tailor the data type for a particular application 112. For example, a developer of an application 112 for a baking web site may redefine an aggregate data type so that the total is expressed in dozens (e.g., the bakery's inventory of cookies as twenty dozen) rather than single items. Data types as defined in a template 152 may be referred to below as a "base type"; however, as additional properties are defined by a developer, this modified data type may be referred to below as a "concrete data type"/"application data type." In the illustrated embodiment, once a developer has selected a given template 152 via developer UI 142, development server 140 conveys the template selection 144 along with any additional relevant information received via UI 142 to template service 150, which stores templates 152.

Template service 150, in various embodiments, is a computing system configured to manage non-relational database 130 and facilitate interfacing applications 112 with non-relational database 130. Accordingly, in response to receiving a template selection 144, service 150 may issue a set of data definition language (DDL) instructions 154 to provision database 130 with a schema 132 that implements the data types defined by the selected database template 152 (or add to an existing schema 132 in database 130). For example, if a template 152 defining an aggregate data type is selected, service 150 may issue DDL instructions 154 to cause schema 132 to implement the aggregate data type. Once schema 132 has been appropriately configured, service 150 may service data manipulation requests 114 to manipulate data values 134 having the data types of the selected template 152. For example, an application 112 may issue a request to update a data value 134 stored in database 130. Service 150 may then identify, based on the selected template 152, a set of data manipulation language (DML) instructions 156 to implement this update and issue the set of DML instructions 156 to database 130.

In various embodiments, identifying the appropriate set of DML instructions 156 may include translating information specified in a received request 114 to information defined in a template 152. Accordingly, in some embodiments, a given request 114 may specify a requested operation for a concrete type/application type (e.g., "inventory" data type), which service 150 translates to a corresponding base type (e.g., an aggregate data type) in order to identify the corresponding template 152. Service 150 may then access the identified template to determine what DML instructions 156 should be issued to non-relational database 130 based on the requested operation.

In various embodiments, a template 152 may also identify instructions to be executed by service 150 to implement requested operations. In some embodiments, these instructions may include, for example, instructions for maintaining a local cache of one or more data values 134, which can be used to service requests 114 (as opposed to accessing database 130 for the values 134). Templates 152 may also include instructions for creating indexes from information in database 130 and accessing those indexes to perform requested operations. Templates 152 may also include instructions for ensuring atomicity, consistency, isolation, and durability (ACID). Notably, these various actions may be handled by service 150 in a manner that is entirely transparent to an application 112 (and its developer).

Figure 2:
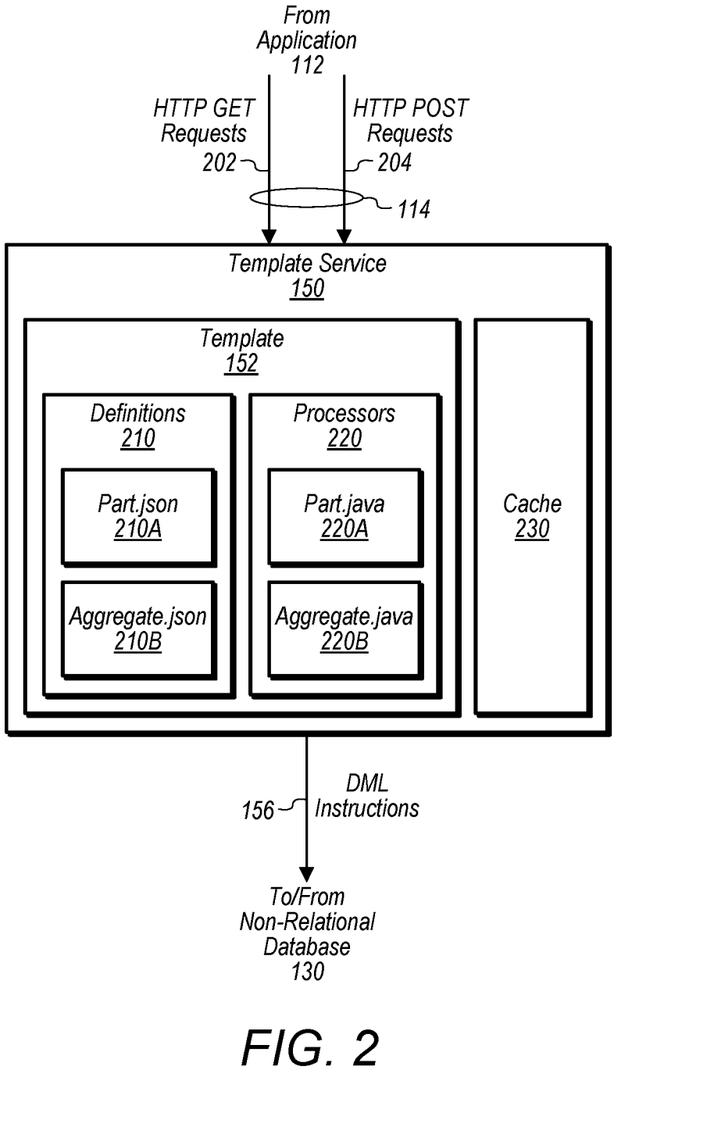
FIG. 2 is a block diagram illustrating one embodiment of a template service of the development platform.

Turning now to FIG. 2, a block diagram of template service 150 is depicted. In the illustrated embodiment, service 150 includes one or more templates 152, which include definitions 210 and processors 220. As shown, service 150 also includes a cache 230. In some embodiments, service 150 may be implemented differently than shown.

In the illustrated embodiment, applications 112 communicate data manipulation requests 114 using hypertext transfer protocol (HTTP) GET requests 202 and HTTP POST requests 204. In such an embodiment, applications 112 may use HTTP GET requests 202 to request data values 134 from database 130—e.g., the current inventory of items in a warehouse. Applications 112 may use HTTP POST requests 204 to provide information for database 130—e.g., notifying that an item of the inventory has been removed. In some embodiments, requests 202 and 204 may be compliant with the representational state transfer (REST) architecture and/or Open Data Protocol (OData). In some embodiments, information in requests may be expressed using extensible markup language (XML), JavaScript® object notation (JSON), etc. In other embodiments, requests 114 may be expressed using a different syntax and/or a protocol other than HTTP. In some embodiments, requests 202 and 204 may be considered as DML instructions themselves, but may be in a format that is not understood by database 130. When a given request 114 is received, service 150 may access definitions 210 and processors 220 to appropriately process the request 114.

Definitions 210, in various embodiments, are metadata defining the data types supported by a template 152. As will be described below with respect to FIG. 3, a definition 210 may, for example, identify a name of the data type, fields of the data type, and/or its relationships to other data types. A definition 210 may also include a pointer to its corresponding processor 220. In some embodiments, definitions 210 for a given template 152 are accessed when schema 132 is provisioned in database 130 in order to determine what specific data types are to be implemented in database 130. When a data manipulation request 114 is later received, definitions 210 may also be accessed to determine how to parse a request 114 and identify the corresponding processors 220.

Processors 220, in various embodiments, define the behaviors/operations that can be performed with respect to a given data type. As will be described below with respect to FIG. 4, processors 220 may include DML instructions (or call functions that include the instructions) to be executed by database 130 in order to facilitate performance of a requested operation. For example, if a request 114 is received to perform a creation for a particular data type, service 150 may examine that data type's processor 220 to identify the DML instructions for performing the requested creation. In some embodiments, processors 220 may also include DDL instructions 154 to be executed by database 130 when a template selection 144 is received in order to provision database 130 with a schema 132. For example, if selection 144 identifies an aggregate data type, that type's processor 220 may include a constructer function including the appropriate DDL instructions to provision schema 132 with the aggregate data type. In some embodiments, processors 220 also includes various program instructions to be executed by service 150 such as managing cache 230, creating indexes, etc. as noted above. These program instructions may also include instructions to calculate various metrics such as the total number of parts in a warehouse.

Cache 230, in various embodiments, is a local storage in service 150 for caching information stored in database 130. In various embodiments, this information may include portions of schema 132, data values 134, indexes, triggers, unions, procedures, etc. For example, if a developer has selected an aggregate data type, a data value 134 of the aggregate data type may be stored in cache 230 in order to quickly service frequent requests 114 to read the data value 134. In some embodiments, cache 230 is a write-through cache in which a write of data value 134 to cache occurs with a corresponding write to database 130; in other embodiments, cache 230 is a write-back cache in which a data value 134 is written to database 130 upon eviction from cache 230. Cache 230 may also use any suitable eviction scheme such as evicting the least frequently used entries, evicting the least recently used entries, etc.

A reoccurring example discussed above has been an aggregate data-type template 152 used to determine a total/aggregate value for a set of items. As shown in FIG. 2, this exemplary template 152 may include a first definition 210A labeled Part.json and a second definition 210B labeled Aggregate.json. This template 152 may also include a first processor 220A labeled Parts.java and a second processor 220B labeled Aggregate.java. As will be described below respect FIGS. 3-5, this template 152 may be used by an application 112 to present, to a sales representative, a summary that identifies a total value of opportunities for an account. For example, this sales representative might have account with a company that wants to purchase multiple computers for multiple branch offices of the company. As each manager of a branch office contacts the representative to indicate a desired number of computers for his or her office, the representative may want to know the total number of computers to be purchased by the company. In the illustrated embodiment, Part.json is a definition 210 for a part data type that is used to record a value 134 that is accumulated—e.g., a number of computers requested by a given manager. Part.java is the corresponding processor 220 for the part data type and includes program instructions for creating and updating data values 134 of the part data type. Aggregate.json is a definition 210 for the aggregate data type that represents the aggregation of the recorded values—e.g., the total number of computers. Aggregate.java is the corresponding processor 220 that includes the program instructions for determining a data value 134 for this aggregation.

Figure 3:
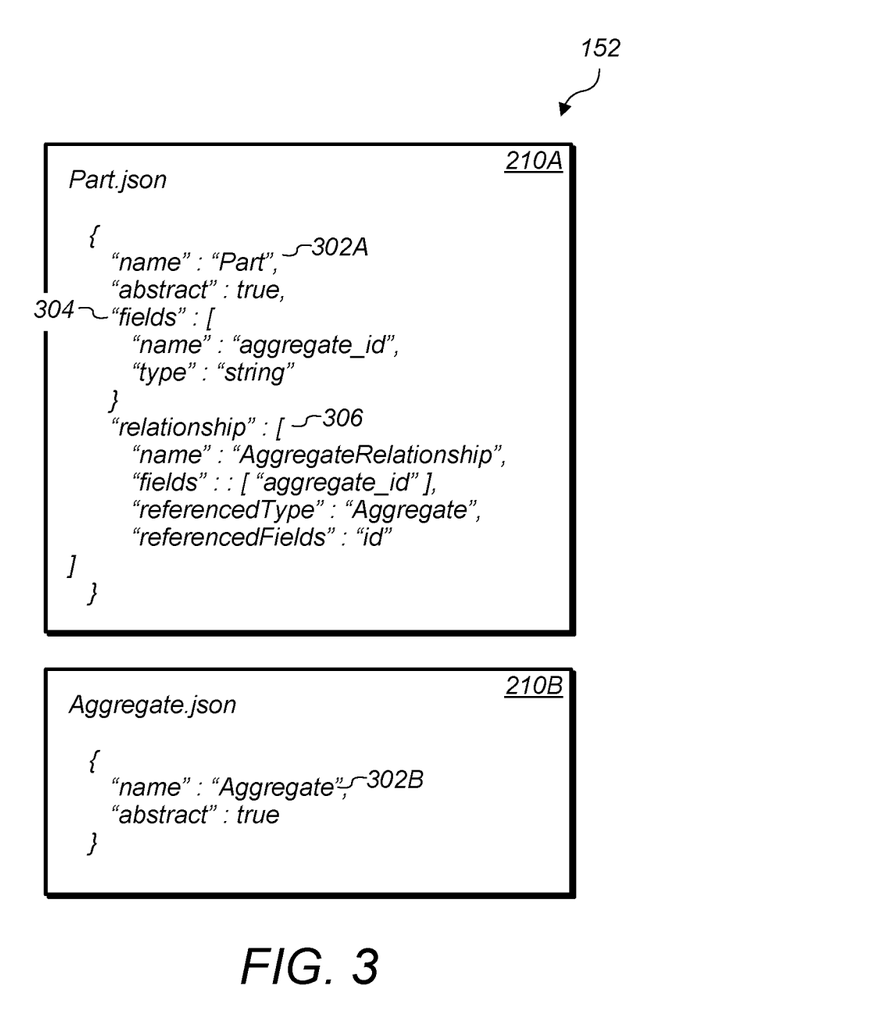
FIG. 3 is a block diagram illustrating one embodiment of a template definition.

Turning now to FIG. 3, a diagram of exemplary definitions 210A and 210B is depicted. In the illustrated embodiment, definitions 210 may include names 302, fields 304, and relationships 306. In other embodiments, more (or less) metadata may be included in definition 210 to define a data type. Although depicted using JSON, definitions 210 may be expressed differently.

Names 302, in various embodiments, are strings used to distinguish data types within a given template 152 from one another—and may be used to identify a particular template 152 when a requested operation is received for that data type. In the illustrated embodiment, a name 302 is also used as an implicit pointer to a corresponding processor 220 having the same name (or a related name). For example, as will be discussed with FIG. 4, definition 210A and processor 220A may share the name "Part" (or at least a portion of the name)—thus, service 150 may identify processor 220A as having the relevant instructions when receiving a request 114 to perform an operation associated with a data type having the name 302 "Part". In other embodiments, however, definitions 210 may include explicit pointers to their respective processors 220.

Fields 304, in various embodiments, define the various values making up a particular data type. Accordingly, the part data type defined by definition 210A includes a name field 304 taking an aggregate_id and a type field 304 taking a string.

Relationships 306, in various embodiments, identify other data types within a given template 152 that are related to that data type. For example, definition 210A identifies that the part data type is related to the aggregate data type. Accordingly, when provisioning database 130 with a schema 132 identifying a part type data, service 150 may examine its relationship 306 to determine other data types (e.g., an aggregate data type) that should also be identified in the schema 132.

Figure 4:
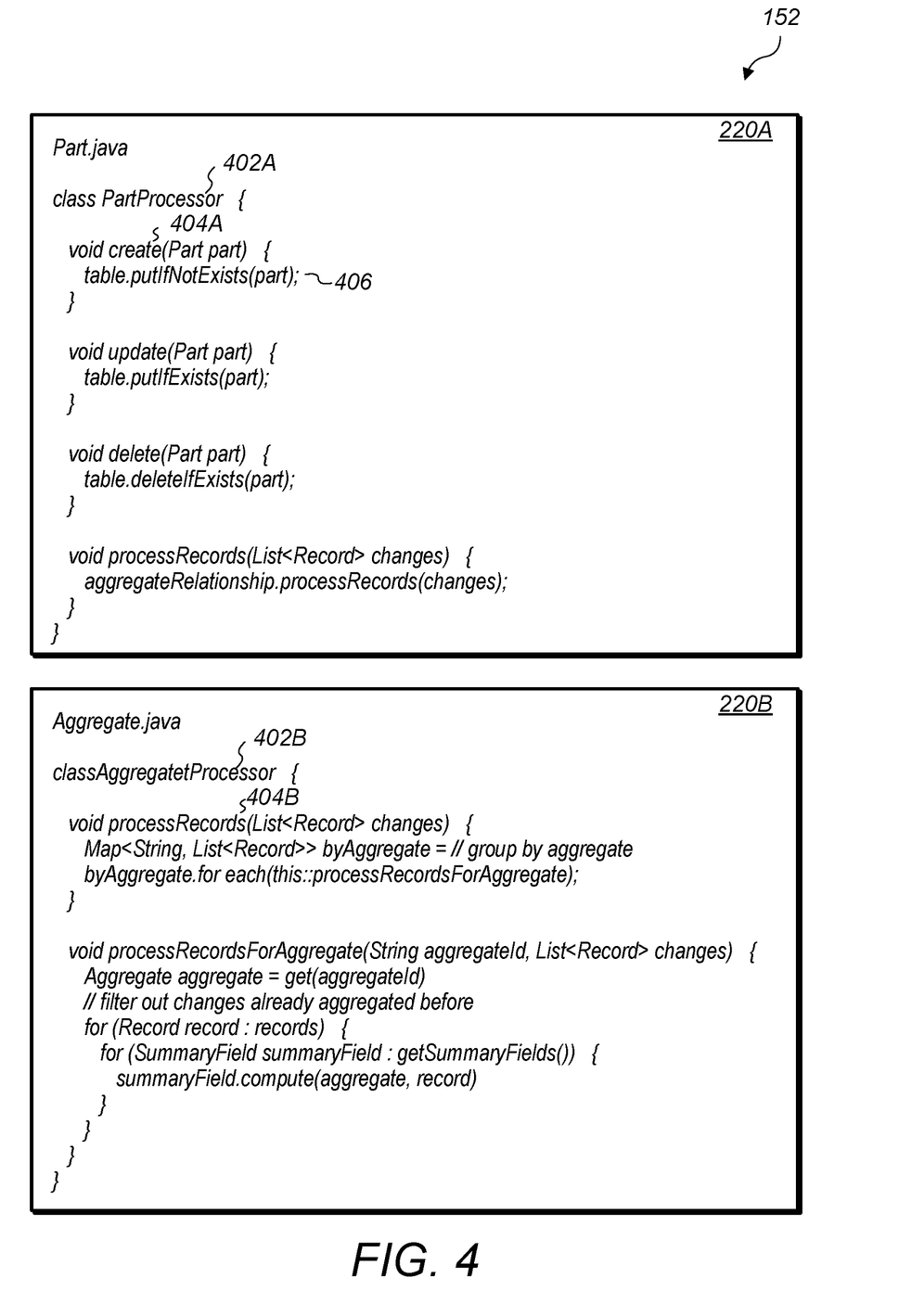
FIG. 4 is a block diagram illustrating one embodiment of a template processor.

Turning now to FIG. 4, a diagram of exemplary processors 220A and 220B is depicted. In the illustrated embodiment, processors 220 have names 402 and a collection of functions 404 including program instructions 406 for execution. In other embodiments, more (or less) metadata may be included in a processor 220 to define a data type. Although depicted using Java, processor 220 may be expressed in another language.

Processor names 402, in various embodiments, are used by service 150 to distinguish between processors of a given template 152. As noted above, in some embodiments, names 402 may also be used to determine relationships between definitions 210 and processors 220.

Functions 404, in various embodiments, define the set of operations/behaviors that can be requested for a given data type. Accordingly, for the part data type, an application 112 can issue a request 114 to perform a creation, update, deletion, or processing of records by identifying one of the functions 404 in processor 220A. In response to receiving a request 114 for one of these operations, service 150 may execute the corresponding instructions 406 to implement the requested operation. For example, if a request 114 specifies a creation of a value 134 for a part data type, service 150 may execute the instruction table.putIfNotExists(part). Although not depicted, the function table.putIfNotExists may include the appropriate DML instructions 156 to be issued by service 150 to cause database 130 to store a received value 134. (Accordingly, in some embodiments, a processor 220 may not include the DML instructions 156 being issued, but rather calls another function with the instructions 156.) In some embodiments, the input object Part includes a key-value pair identifying both the value and the key associated with where the value 134 is to be stored in non-relational database 130. This key may be provided by an application 112 in a request 114.

Figure 5:
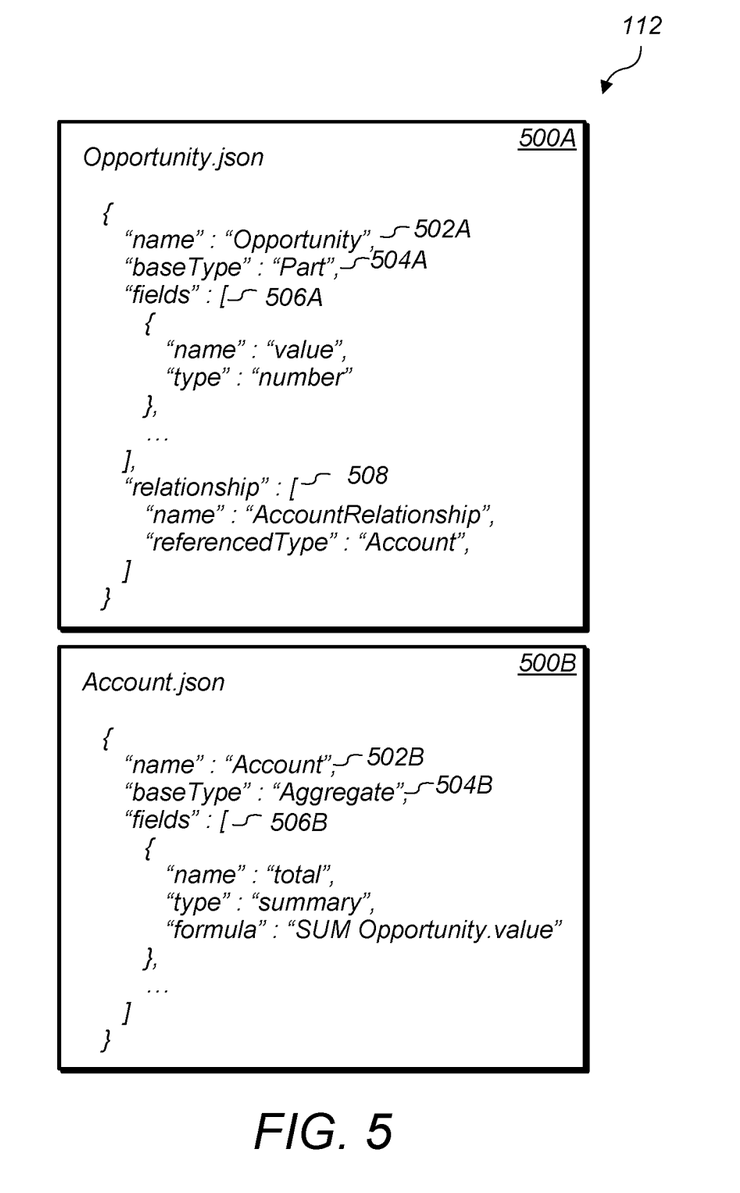
FIG. 5 is a block diagram illustrating one embodiment of metadata mapping an application data type to a template data type.

Turning now to FIG. 5, a diagram of exemplary mapping metadata 500 is depicted. As noted above, in some embodiments, a template 152 may define a base data type and allow a developer to specify additional parameters specific to an application 112 creating a concreate/application data type. In such embodiment, an application 112 may issue request 114 relative the application data type (as opposed to the base type), and service 150 may use mapping metadata 500 to translate the application data type to its corresponding base type. In some embodiments, mapping metadata 500 is received from developer server 140 and stored in service 150. In another embodiment, service 150 requests metadata 500 from an application 112.

Continuing with the sales representative example discussed above, metadata 500 may include metadata 500A for an opportunity data type (an application data type) corresponding to a part data type (a base data type) and metadata 500B for an account data type (another application data type) corresponding to an aggregate type (another base data type). In the illustrated embodiment, metadata 500 includes an application data type name 502, a base type name 504, fields 506, and relationships 508.

Application data type name 502, in various embodiments, is a name of the concrete/application data type associated with a particular application 112. As noted above, an issued request 114 from an application 112 may identify this name 504, which then is translated using mapping metadata 500 to the base data type name 504.

Base data type name 504, in various embodiments, is the name of a template-defined/base type—e.g., the name specified in a definition 210 for that base type. Accordingly, when a request 114 is received for an opportunity data type, service 150 may determine, from the name 504 in metadata 500A, that the base data type is a part data type and then access definition 210A and processor 220A to determine what to do for a requested operation associated with that data type. For example, if a sales representative receives a request from a manager to sale a particular number of computers to a branch office of a company, application 112 may issue a request 114 to create a record of this opportunity in database 130—service 150 can then use mapping to determine that this opportunity data corresponds to a part data type in the exemplary template 152 discussed above.

Fields 506, in various embodiments, further define fields of base data types. For example, the type field 506A now specifies a number as opposed to merely a string. Fields 506 may also expand the existing fields of a base data type. For example, field 506B defines a formula for how to determine the total opportunities of an account.

Relationships 508, in various embodiments, define relationships between application data types. For example, relationship 508 indicates that the opportunity data type is related to the account data type.

Figure 6A:
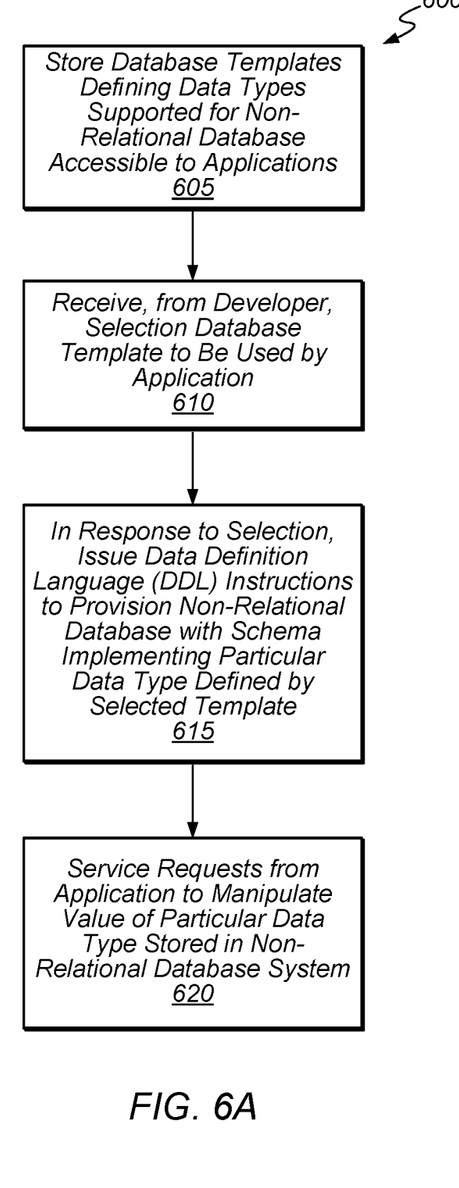
FIGS. 6A-6C are flow diagrams illustrating embodiments of methods associated with templates.

Turning now to FIG. 6A, a flowchart of a method 600 of providing database templates is shown. Method 600 is one embodiment of a method performed by a computing system such as one implementing template service 150. In some instances, performance of method 600 may allow a developer to efficiently implement support for a non-relational database.

In step 605, the computing system stores a plurality of database templates (e.g., templates 152) that define data types supported for a non-relational database (e.g., database 130) accessible to a plurality of applications (e.g., applications 112). In some embodiments, storing a database template includes storing metadata (e.g., definitions 210) defining one or more fields of a particular data type and storing DML instructions (e.g., processors 220) to executable by the non-relational database to implement one or more operations identifiable in a requests from an application.

In step 610, the computing system receives, from a developer of an application, a selection (e.g., template selection 144) of one of the plurality of database templates to be used by the application. In various embodiments, the selection of the database template is received via a graphical user interface (e.g., developer UI 142) operable to present the plurality of templates to the developer.

In step 615, the computing system issues, in response to the selection, a set of data definition language (DDL) instructions (e.g., DDL instructions 154) to provision the non-relational database with a schema (e.g., schema 132) that implements a particular data type defined by the selected database template.

In step 620, the computing system services requests (e.g., data manipulation requests 114) from the application to manipulate a value (e.g., data value 134) of the particular data type stored in the non-relational database. In various embodiments, the servicing includes receiving, from the application, data requesting manipulation (e.g., a request 114) of the value of the particular data type, identifying, based on the selected database template, a set of data manipulation language (DML) instructions (e.g., DML instructions 156) to be executed with respect to the received data, and issuing the set of DML instructions to the non-relational database. In some embodiments, the data requesting manipulation specifies a data type of the application, and the servicing includes translating the data type of the application to the particular data type defined by the selected database template. In some embodiments, the servicing includes identifying a key that corresponds to the value of the particular data type and specifying the identified key in the set of DML instructions issued to the non-relational database, the non-relational database being a key-value storage. In some embodiments, the servicing includes determining that the data requesting manipulation requests a write operation and accessing the selected database template to identify a set of DML instructions to cause the non-relational database to perform the write operation. In some embodiments, the servicing includes communicating with an application server (e.g., application server 110) operable to serve the application to a plurality of client devices (e.g., client devices 120). In some embodiments, the servicing includes receiving, from the application, a hypertext transfer protocol (HTTP) POST request (e.g., request 204) to manipulate the value of the particular data type stored in the non-relational database.

Figure 6B:
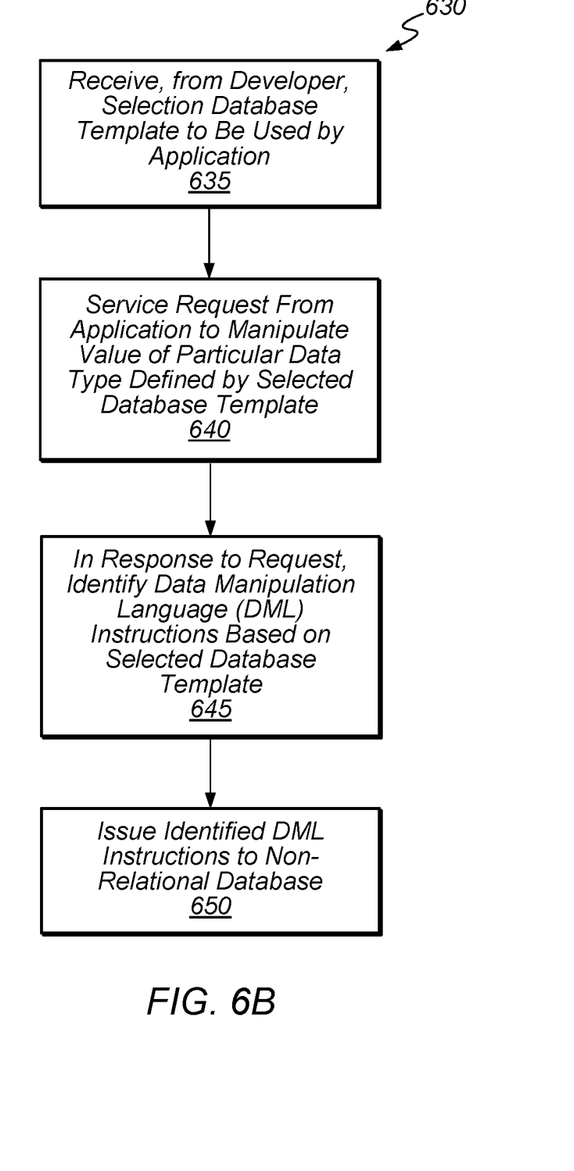

Turning now to FIG. 6B, a flowchart of a method 630 of providing database templates is shown. Method 630 is one embodiment of a method performed by a computing system such as one implementing template service 150. In some instances, performance of method 630 may allow a developer to efficiently implement support for a non-relational database.

Method 630 begins in step 635 with a computing system receiving, from a developer of an application (e.g., application 112), a selection (e.g., template selection 144) of one of a plurality of database templates (e.g., templates 152) to be used by the application. In various embodiments, the database templates define data types supported for a non-relational database (e.g., database 130) accessible to the application. In some embodiments, the application is hosted on an application server (e.g., server 110) configured to serve the application to a plurality of client devices (e.g., client devices 120) and to communicate with the computing system. In various embodiments, in response to the selection, the computing system issues a set of data definition language (DDL) instructions (e.g., DDL instructions 154) to provision the non-relational database with a schema (e.g., schema 132) that implements the particular data type defined by the selected database template. In step 640, the computing system services a request (e.g., a request 114) from the application to manipulate a value (e.g., data value 134) of a particular data type defined by the selected database template. In step 645, in response to the request, the computing system identifies a set of data manipulation language (DML) instructions (e.g., DML instructions 156) based on the selected database template. In some embodiments, the identifying includes translating a data type specified by the application in the request to the particular data type defined by the selected database template and identifying the set of DML instructions based on the translating. In step 650, the computing system issues the identified set of DML instructions to the non-relational database. In some embodiments, the computing system storing an instance of the value of the particular data type in a cache (e.g., cache 230) of the computing system and servicing a request (e.g., HTTP get request 202) to read the value from the non-relational database by reading the value from the cache.

Figure 6C:
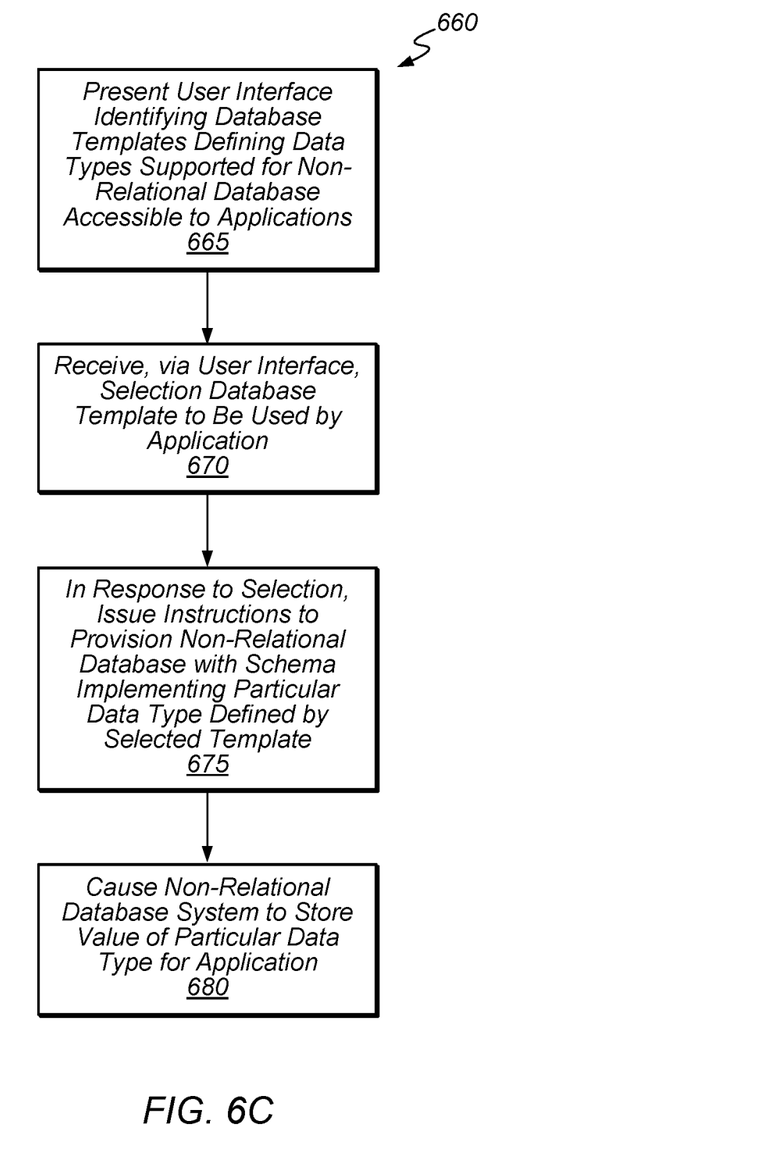

Turning now to FIG. 6C, a flowchart of a method 660 of providing database templates is shown. Method 660 is one embodiment of a method performed by a computing system such as development platform 10. In some instances, performance of method 660 may allow a developer to efficiently implement support for a non-relational database.

Method 660 begins in step 665 with the computing system presenting a user interface (e.g., developer UI 142) identifying a plurality of database templates (e.g., templates 152) that define data types supported for a non-relational database (e.g., non-relation database 130) accessible to a plurality of applications (e.g., applications 112). In step 670, the computing system receives, via the user interface, a selection (e.g., template selection 144) of one of the plurality of database templates to be used by an application. In step 675, the computing system issues, in response to the selection, a set of instructions (e.g., DDL instructions 154) to provision the non-relational database with a schema (e.g., schema 132) that implements a particular data type defined by the selected database template. In some embodiments, the particular data type is one of a plurality of data types defined by the selected database template. In step 680, the computing system causes the non-relational database to store a value (e.g., data value 134) of the particular data type for the application.

In some embodiments, method 660 includes receiving, from the application, a request to store the value. In one embodiment, the request is a hypertext transfer protocol (HTTP) POST request (e.g., HTTP POST request 204) issued from a server (e.g., server 110) hosting the application. In some embodiments, the causing includes issuing a data manipulation language (DML) instruction (DML instruction 156) to store the value of the particular data type in non-relational database, the instruction identifying the value and a key associated with the value. In some embodiments, method 660 includes storing a copy of the value of the particular data type in a cache (e.g., cache 230) and reading the copy of the value from the cache in response to a request from the application to read the value.

Exemplary Computer System

Figure 7:
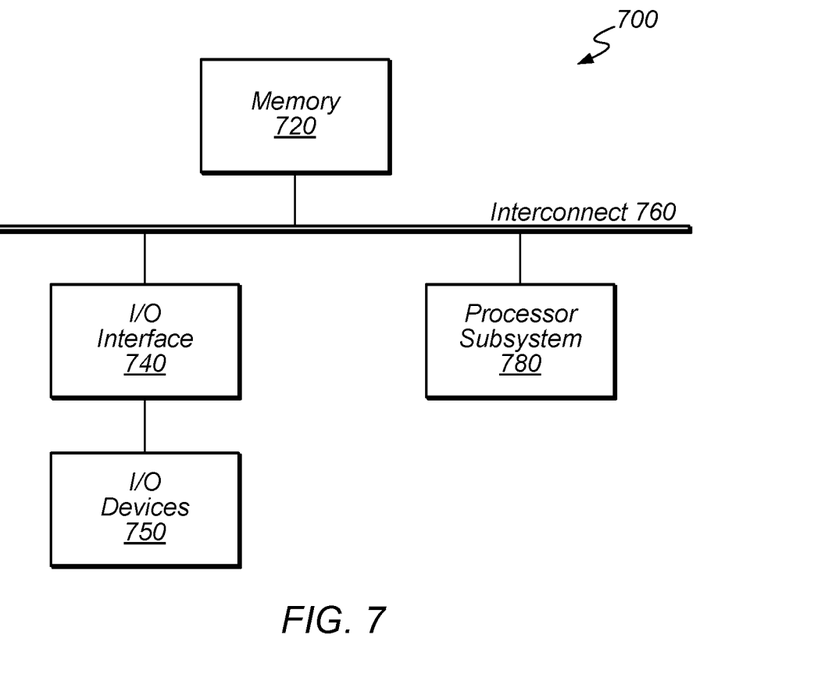
FIG. 7 is a block diagram illustrating one embodiment of an exemplary computer system.

Turning now to FIG. 7, a block diagram of an exemplary computer system 700, which may implement computing device 100, is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Computer system 700 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory. In one embodiment, processor subsystem 780 may include processor(s) 102 described above.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, application 112, developer UI 142, etc. described above may be included within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having program instructions stored therein that are capable of causing a computing system to implement a service performing operations comprising:
maintaining a software development platform that hosts applications provided by a plurality of developers, wherein the maintaining includes storing a plurality of database templates that define data types supported for a non-relational database accessible to one or more of the applications;
receiving, from a developer of an application and via a graphical user interface of the development platform, a selection of one of the plurality of database templates to be used by the application;
in response to the selection, issuing a set of data definition language (DDL) instructions to provision the non-relational database with a schema that implements a particular data type defined by the selected database template; and
servicing a request from the application to manipulate a value of the particular data type stored in the non-relational database.

2. The computer readable medium of claim 1, wherein the servicing includes:
receiving, from the application, data requesting manipulation of the value of the particular data type;
based on the selected database template, identifying a set of data manipulation language (DML) instructions to be executed with respect to the received data; and
issuing the set of DML instructions to the non-relational database.

3. The computer readable medium of claim 2, wherein the data requesting manipulation specifies a data type of the application; and
wherein the servicing includes translating the data type of the application to the particular data type defined by the selected database template.

4. The computer readable medium of claim 3, wherein the servicing includes:
identifying a key that corresponds to the value of the particular data type; and
specifying the identified key in the set of DML instructions issued to the non-relational database, wherein the non-relational database is a key-value storage.

5. The computer readable medium of claim 2, wherein the servicing includes:
determining that the data requesting manipulation requests a write operation; and
accessing the selected database template to identify a set of DML instructions to cause the non-relational database to perform the write operation.

6. The computer readable medium of claim 2, wherein storing the database template includes storing metadata defining one or more fields of the particular data type and storing DML instructions executable by the non-relational database to implement one or more operations identifiable in the requests from the application.

7. The computer readable medium of claim 1, wherein the operations comprise:
storing the value of the particular data type in a cache of the computing system, wherein the cache is distinct from the non-relational database; and
servicing a request from the application to read the value of the particular data type by reading the stored value from the cache.

8. The computer readable medium of claim 1, wherein the servicing includes:
communicating with an application server operable to serve the application to a plurality of client devices.

9. The computer readable medium of claim 8, wherein the servicing includes:
receiving, from the application, a hypertext transfer protocol (HTTP) POST request to manipulate the value of the particular data type stored in the non-relational database.

10. A method, comprising:
a computing system receiving, from a developer of an application, a selection of one of a plurality of database templates to be used by the application, wherein the database templates define data types supported for a non-relational database accessible to the application;
in response to the selection, the computing system issuing a set of data definition language (DDL) instructions to provision the non-relational database with a schema that implements a particular data type defined by the selected database template;
the computing system servicing a request from the application to manipulate a value of the particular data type defined by the selected database template;
in response to the request, the computing system identifying a set of data manipulation language (DML) instructions based on the selected database template; and
the computing system issuing the identified set of DML instructions to the non-relational database.

11. The method of claim 10, wherein the identifying includes:
translating a data type specified by the application in the request to the particular data type defined by the selected database template; and
identifying the set of DML, instructions based on the translating.

12. The method of claim 10, further comprising:
the computing system storing an instance of the value of the particular data type in a cache of the computing system; and
the computing system servicing a request to read the value from the non-relational database by reading the value from the cache.

13. The method of claim 10, wherein the application is hosted on an application server configured to serve the application to a plurality of client devices and to communicate with the computing system.

14. A non-transitory computer readable medium having program instructions stored thereon that are capable of causing a computing system to implement operations comprising:
presenting a user interface identifying a plurality of database templates that define data types supported for a non-relational database accessible to a plurality of applications;
receiving, via the user interface, a selection of one of the plurality of database templates to be used by an application;
in response to the selection, issuing a set of instructions to provision the non-relational database with a schema that implements a particular data type defined by the selected database template; and causing the non-relational database to store a value of the particular data type for the application.

15. The computer readable medium of claim 14, wherein the operations comprise:
receiving, from the application, a request to store the value, wherein the request is a hypertext transfer protocol (HTTP) POST request issued from a server hosting the application.

16. The computer readable medium of claim 14, wherein the causing includes issuing a data manipulation language (DML) instruction to store the value of the particular data type in non-relational database, wherein the instruction identifies the value and a key associated with the value.

17. The computer readable medium of claim 14, wherein the operations comprise:
storing a copy of the value of the particular data type in a cache; and
reading the copy of the value from the cache in response to a request from the application to read the value.

18. The computer readable medium of claim 14, wherein the particular data type is one of a plurality of data types defined by the selected database template.

* * * * *